United States Patent [19]

Kondo et al.

[11] 3,925,155

[45] Dec. 9, 1975

[54] PREPARATION OF 6-AMINOPENICILLANIC ACID 1-OXIDE

[75] Inventors: Eiji Kondo, Ikeda; Takashi Mitsugi, Takaishi; Ryonosuke Muneyuki, Takatsuki, all of Japan

[73] Assignee: Shionogi & Co., Ltd., Osaka, Japan

[22] Filed: Sept. 11, 1974

[21] Appl. No.: 505,086

[30] Foreign Application Priority Data

Sept. 21, 1973 Japan................................ 48-107299

[52] U.S. Cl. ............................................. 195/36 P
[51] Int. Cl.$^2$ .......................................... C12D 9/14
[58] Field of Search ................ 195/36 P; 260/239.1

[56] References Cited

UNITED STATES PATENTS

| | | | |
|---|---|---|---|
| 3,121,667 | 2/1964 | Platt et al. | 195/36 P |
| 3,275,626 | 9/1966 | Morin et al. | 260/239.1 |

*Primary Examiner*—Alvin E. Tanenholtz
*Attorney, Agent, or Firm*—Wenderoth, Lind & Ponack

[57] ABSTRACT

6-Aminopenicillanic acid 1-oxide or its salt is prepared by the action of a microorganism belonging to the genus Streptomyces or its mycelium preparation on a penicillin 1-oxide or its salt.

9 Claims, No Drawings

PREPARATION OF 6-AMINOPENICILLANIC ACID 1-OXIDE

This invention relates to a process for the preparation of 6-aminopenicillanic acid 1-oxide or its salt, a starting material for the synthesis of synthetic penicillins and cephalosporins, from a penicillin 1-oxide or its salt by the action of a microorganism belonging to the genus Streptomyces or its mycelium preparation.

According to the process of this invention, a penicillin 1-oxide or its salt is subjected to the action of a microorganism belonging to the genus Streptomyces or its mycelium preparation, and the produced 6-aminopenicillanic acid 1-oxide or its salt is separated and isolated in a crude or pure state.

The said 1-oxide of penicillin utilizable as a substrate for this invention can be that of penicillin G, penicillin V, or like penicillins.

The salt can be a water-soluble salt (e.g. alkali metal salts including sodium and potassium salts, or optionally alkylated ammonium salts) which does not interfere with the reaction of this invention.

The microorganism for the preparation of 6-aminopenicillanic acid 1-oxide or its salt from a penicillin 1-oxide or its salt belongs to the genus Streptomyces, and possesses the penicillin 1-oxide amidase activity. The said penicillin 1-oxide amidase is an enzyme, enzyme system or enzymatic activity capable of producing 6-aminopenicillanic acid 1-oxide or its salt from a penicillin 1-oxide or its salt. Specific microorganisms for this invention are exemplified by the following known microorganisms:

*Streptomyces setonii* (Millard and Burr) Waksman ATCC 25497;

*Streptomyces griseorubiginosus* Ryabova and Preobrazhenskaya ATCC 23627;

*Streptomyces fimicarius* (Duche) Waksman and Henrici ATCC 25449; and *Streptomyces fasiculatus* (Sic) Pittenger and Nelms ATCC 19751, and other species of said genus, possessing said penicillin 1-oxide amidase activity.

The use of natural or artificial mutants or variants belonging to said genus and possessing said penicillin 1-oxide amidase activity is also included in the scope of this invention. The artificial mutants can be produced by such conventional methods as X-ray irradiation, ultra-violet irradiation, chemical mutation (e.g. with nitrogen mustard), and like methods.

The microorganism can be inoculated and propagated in a natural or artificial nutrient medium suitable for the propagation of the microorganism. Representative media contain the following ingredients: such nitrogen or carbon sources as a carbohydrate (e.g. glucose, fructose, maltose, sucrose, starch, starch hydrolyzate, sorbitol, honey, potato powder, flour), bouillon, yeast extract, peptone, corn steep liquor, fish meal, fish meal extract, casein hydrolyzate, soy bean meal, casamion acid, rice bran extract, urea, ammonia, ammonium salt (e.g. chloride, sulfate, nitrate, acetate, phosphate), organic acid (e.g. acetic acid, lactic acid), and like sources; inorganic salts (e.g. magnesium sulfate, sodium phosphate, iron sulfate, manganese chloride, copper chloride, zinc chloride); and/or other materials necessary or preferable for the growth of the microorganism (e.g. fungal vitamine, amino acid). The propagation is carried out preferably under aerobic condition (e.g. by shaking or static culture, culture under aeration or stirring), and preferably at pH 5 to 9, at 20°C to 40°C, for 1 to 5 days to give the desired mycelia or propagated microorganism. The propagation can be carried out in the presence of a penicillin 1-oxide for the induction of said penicillin 1-oxide amidase.

The action of a microorganism belonging to said genus on the penicillin 1-oxide or its salt is effected by contacting the penicillin 1-oxide or its salt in a form of powder, suspension, or solution in an aqueous or hydrophilic organic solvent with the microorganism or its mycelium preparation in aqueous medium.

The microorganism (mycelium) is obtained by filtering or centrifuging the propagated broth followed by washing the solid material with water or buffer solution to remove the nutrient solution and other contaminants. If necessary, the microorganism can be dried with a water soluble organic solvent (e.g., acetone, ethanol).

The said mycelium preparation is that which is available for utilization of the penicillin 1-oxide amidase activity of the intra- or extra-cellular enzyme system of the microorganism. The preparation can be, for example, in a form of the propagated culture broth, washed mycelia or the microorganism, culture broth from which the microorganism is removed, or enzyme solution. The enzyme solution includes a crude enzyme solution containing homogenate of mycelium obtained by homogenating said microorganism; crude or purified enzyme obtained by a conventional method in the art from the said mycelium homogenate [by e.g. salting out (with e.g. ammonium sulfate), dialysis, precipitation (with e.g. acetone, ethanol), chromatography, gel filtration, centrifugation, electrophoresis, and like methods]; and the microorganism or its crude or purified enzyme combined with a solid material (e.g. Cephadex, DEAE cellulose, Celite, active charcoal, acrylic resin, ion exchange resin) to form a solid enzyme preparation.

The hydrophilic organic solvent (e.g. alcohol, acetone) is used at a concentration at which it does not inhibit the action of said penicillin 1-oxide amidase. The aqueous medium includes a buffer solution, salt solution, the nutrient medium used for propagation, distilled water, and like media. Aerobic condition is not essential, but preferable. Shaking and stirring are preferable. Preferable conditions are pH 5 to 8, at 20°C to 40°C, for 5 to 50 hours, although the values vary depending on the concentration and sort of the penicillin 1-oxide or its salt, sort of the microorganism, procedure for the treatment, and other conditions. If necessary, an acid, base, or buffer solution can be added when the pH of the medium changes during reaction. Preferable concentration of the starting penicillin 1-oxide is 0.1 to 5 percent, especially 0.1 to 2 percent.

Isolation and purification of the produced 6-aminopenicillanic acid 1-oxide or its salt can be effected by a conventional method in the art [e.g. removing the microorganism, mycelium preparation or insoluble material from the reaction mixture (by means of e.g. filtration, centrifugation, absorption, denaturation, etc., or the combination of these); followed by isolation (by means of e.g. absorption, fractional extraction, concentration, separation, precipitation, or other methods); and by purification (by means of e.g. recrystallization, absorption, chromatography, ion-exchange, or other conventional methods in the art)]. The product, 6-aminopenicillanic acid 1-oxide, can be isolated as a salt at the carboxy group (e.g. sodium, potassium, magnesium, amine salts); or as a salt at the produced amino group (e.g. p-toluenesulfonate, rhodanate, hydrochloride, sulfate, nitrate).

The product, 6-aminopenicillanic acid 1-oxide or its salt can be utilized as a starting material for the synthesis of useful synthetic penicillins, cephalosporins, or other substances.

For example, acylation of 6-aminopenicillanic acid 1-oxide or its salt or ester gives a penicillin 1-oxide or its salt or ester, which are useful as an intermediate for the synthesis of penicillins and cephalosporins. For the acylation, an acid or its anhydride, reactive ester, reactive amide, halide, or other reactive derivative of the acid having the desired acyl group is reacted with 6-aminopenicillanic acid 1-oxide or its salt or ester according to conventional methods used in the acylation of 6-aminopenicillanic acid. If required, a condensing reagent, acid trapping reagent, etc. (carbodiimide e.g. N,N'-dicyclohexylcarbodiimide, organic base e.g. triethylamine) can be added to the reaction medium. Conventional salts for this purpose are alkali metal salts, organic base salts, etc.; and conventional esters for this purpose are trimethylsilyl ester, trimethyltin ester, phenacyl ester, acyloxymethyl ester, and the like esters which can be removed easily in vitro or in vivo, all being conventional in the art.

As stated above, the product of the following Examples is used for the production of penicillin 1-oxide e.g. according to the following preparations:

PREPARATION 1

To a solution of crude 6-aminopenicillanic acid 1-oxide (270 mg) in de-ionized water (10 ml) is added sodium hydrogen carbonate (153 mg). To the solution is added dropwise a solution of phenoxyacetyl chloride (bp. 132°–133°C/35 mmHg: 181 mg) in dioxane (3 ml) under cooling in iced water and stirring. After stirring for 45 minutes, a further amount of sodium hydrogen carbonate (50 mg) and a solution of phenoxyacetyl chloride (60 mg) in dioxane (1 ml) are added to the mixture, and the mixture is stirred for 15 minutes. The reaction mixture is mixed with ice (2 g) and 5 percent aqueous solution of sodium hydrogen carbonate (2 ml), and extracted with ether (50 ml). The aqueous layer is acidified with hydrochloric acid to pH 2.5, and separated crystals are collected by filtration, washed with water, and dried to give penicillin V 1-oxide (360 mg). m.p. 170°C (decomposition). Yield: 85 percent. This compound is identical with authentic samples prepared by another method.

PREPARATION 2

To a solution of 6-aminopenicillanic acid 1-oxide (180 mg) and triethylamine (0.09 ml) in chloroform (5 ml) is added at −30°C a solution of phenyl chlorocarbonyl ketene (170 mg) in chloroform (2 ml), and the mixture is stirred for 1 hour. The reaction mixture is concentrated, and the resulting residue is dissolved in methyl ethyl ketone, diluted with water, and acidified with hydrochloric acid to pH 3.6. The aqueous layer is acidified to pH 2, and extracted with methyl ethyl ketone. The extract solution is washed with saturated saline solution, dried, and evaporated to give carbenicillin 1-oxide. IR:$\nu_{max}^{Nujol}$ 1786, 1030, 1015 cm$^{-1}$. NMR: +102, +126 Hz (from CH$_3$OH; in D$_2$O; 60 MHz; as sodium salt).

PREPARATION 3

To a solution of 6-trimethylsilylaminopenicillanic acid trimethylsilyl ester 1-oxide in methylene chloride, prepared from 6-aminopenicillanic acid 1-oxide (110 mg) and trimethylsilyl chloride, is added phenylacetyl chloride (80 mg), and the mixture is stirred for 1 hour. The reaction mixture is washed with water, dried, and mixed with a solution of sodium 2-ethylhexanoate in isopropanol. The separated crystals are collected by filtration to give penicillin G sodium salt 1-oxide. IR:$\nu_{max}^{Nujol}$ 1785, 1030, 1015 cm$^{-1}$.

The produced penicillin 1-oxide can be reduced to give penicillins by the action of conventional reducing reagents, including phosphorous trihalides, as known to those skilled in the art.

Furthermore, the product of the examples, 6-aminopenicillanic acid 1-oxide, gives the corresponding antibacterial 7-aminodeacetoxycephalosporanic acid derivatives by the conventional acylation and ring enlargement.

The following examples represent presently preferred embodiments of this invention, but it is to be understood that the examples are given by way of illustration only and not for limitation.

EXAMPLE 1

To a sterilized nutrient solution (200 ml) comprising an aqueous solution (pH 7.0) of glucose (1 percent), peptone (0.5 percent), yeast extract (0.5 percent) and sodium chloride (0.3 percent) is inoculated *Streptomyces setonii* ATCC 25497, and the solution is cultured with shaking at 28°C for 2 days. The propagated broth is centrifuged to collect mycelia, which are washed with de-ionized water. The washed mycelia thus obtained are suspended in de-ionized water (200 ml) containing penicillin V 1-oxide (400 mg) in a form of sodium salt obtained by neutralization with aqueous sodium carbonate, and shaken for 24 hours at 28°C. The reaction mixture is filtered to remove the mycelia, and the filtrate is acidified with 4N-sulfuric acid to pH 2.6, and is extracted with three equal volumes of ethyl acetate. Phenoxyacetic acid (145 mg) is obtained by concentration under reduced pressure from the extract solution (m.p. 98°C; IR:$\nu_{max}^{Nujol}$ 1735, 1707, 1594, 1585 cm$^{-1}$). The aqueous layer is neutralized with barium hydroxide to pH 7.0, centrifuged to remove the solid material, and the obtained supernatant is concentrated at 38°–40°C to give crude 6-aminopenicillanic acid 1-oxide as powder (275 mg). IR:$\nu_{max}^{Nujol}$ 1775, 1025, 1010 cm$^{-1}$.

EXAMPLE 2

The propagated broth of *Streptomyces setonii* ATCC 25497 prepared by a procedure similar to that in Example 1 is centrifuged to remove mycelia. To the supernatant (100 ml) is added penicillin V 1-oxide (200 mg). After adjusting to pH 7.0, the mixture is shaken at 28°C for 45 hours. Thin-layer chromatogram on silica gel (a mixture of aceone, acetic acid, and water (85:6:8 v/v) as developing solvent) does not show the spot of the starting material, but shows massive production of 6-aminopenicillanic acid 1-oxide. Colorimetric determination of the spot on the thin-layer chromatogram shows the yield of about 75 percent based on the starting penicillin V 1-oxide.

EXAMPLE 3

To a sterilized nutrient solution (100 ml) comprising an aqueous solution (pH 7.0) of glucose (1 percent), peptone (0.5 percent), yeast extract (0.5 percent) and sodium chloride (0.3 percent) is inoculated *Streptomyces griseorubiginosus* ATCC 23627, and the solution is cultured with shaking at 28°C for 2 days. The mycelia collected by centrifugation and washing with water, are suspended in M/30 phosphate buffer (pH 7.0; 100 ml) containing penicillin V 1-oxide (200 mg), and the suspension is shaken for 24 hours at 28°C. The thin-layer chromatogram of the reaction mixture shows the production of 6-aminopenicillanic acid 1-oxide to the extent similar to that of Example 2, and the disappearance of the starting penicillin V 1-oxide salt.

EXAMPLE 4

The reaction of Example 3 carried out using *Streptomyces fimicarius* ATCC 25449 in place of *Streptomyces griseorubiginosus* ATCC 23627 in Example 3 gives 6-aminopenicillanic acid 1-oxide to the extent similar to that of Example 2.

EXAMPLE 5

The reaction of Example 3 carried out using *Streptomyces fasiculatus* ATCC 19751 in place of *Streptomyces griseorubiginosus* ATCC 23627 gives 6-aminopenicillanic acid 1-oxide to the extent similar to that of Example 2.

EXAMPLE 6

The reaction of Example 3 carried out using phenethicillin 1-oxide in place of penicillin V 1-oxide in Example 3 gives 6-aminopenicillanic acid 1-oxide.

EXAMPLE 7

To a sterilized nutrient solution (100 ml) comprising an aqueous solution (pH 7.0) of glucose (1 percent), peptone (0.5 percent), yeast extract (0.5 percent) and sodium chloride (0.3 percent) is inoculated *Streptomyces griseorubiginosus* ATCC 23627, and the solution is cultured with shaking at 28°C for 2 days. To the broth is added a solution of penicillin V 1-oxide (200 mg) in water (50 ml) dissolved by neutralizing with aqueous sodium carbonate. The mixture is shaken for another 2 days at 28°C. The thin-layer chromatogram of the reaction mixture shows the production of 6-aminopenicillanic acid 1-oxide. Colorimetric determination of the spot on the thin-layer chromatogram shows the yield of about 65 percent based on the starting penicillin V 1-oxide.

What we claim is:

1. A process for preparing 6-aminopenicillanic acid 1-oxide or a salt thereof which comprises (A) subjecting a penicillin 1-oxide or salt thereof to the penicillin 1-oxide amidase action of (1) a penicillin 1-oxide amidase-producing microorganism of the genus Streptomyces or (2) the mycelium preparation resulting from said microorganism and (B) recovering the resultant 6-aminopenicillanic acid 1-oxide or salt thereof.

2. A process according to claim 1, wherein step A is carried out in an aqueous medium selected from the group consisting of de-ionized water, phosphate buffer and cultured broth.

3. A process according to claim 1, wherein step A is carried out at a pH in the range from 5 to 8.

4. A process according to claim 1, wherein step A is carried out at a temperature in the range from 20°C to 40°C.

5. A process according to claim 2, wherein the concentration of the penicillin 1-oxide or salt thereof in the aqueous medium prior to step A is in the range from 0.1 percent to 2 percent.

6. A process according to claim 1, wherein penicillin V 1-oxide is subjected to step A.

7. A process according to claim 1, wherein an alkali metal salt of penicillin V 1-oxide is subjected to step A.

8. A process according to claim 1, wherein the mycelium preparation is washed mycelia and said washed mycelia is employed in step A.

9. A process according to claim 1, wherein the microorganism is selected from the group consisting of *Streptomyces setonii* ATCC 25497, *Streptomyces griseorubinginosus* ATCC 23627, *Streptomyces fimicarius* ATCC 25449 and *Streptomyces fasiculatus* ATCC 19751.

* * * * *